Sept. 8, 1970

R. ULLMAN 3,527,124

WIRE STRIPPING

Filed Dec. 29, 1967

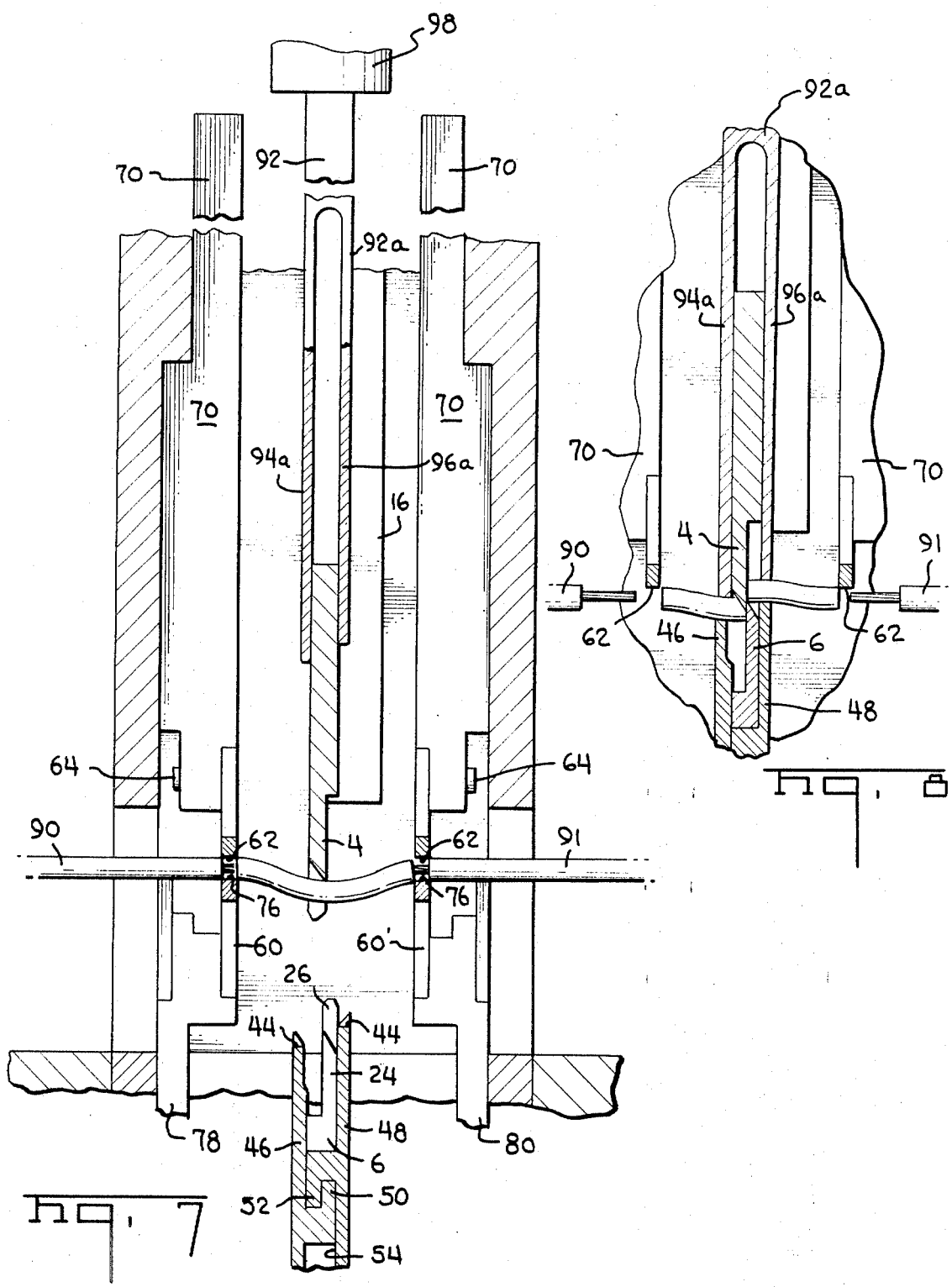

United States Patent Office 3,527,124
Patented Sept. 8, 1970

3,527,124
WIRE STRIPPING
Robert Ullman, Harrisburg, Pa., assignor to
AMP Incorporated, Harrisburg, Pa.
Continuation-in-part of application Ser. No. 652,929,
July 12, 1967. This application Dec. 29, 1967,
Ser. No. 701,804
Int. Cl. H02g 1/12
U.S. Cl. 81—9.51                                    6 Claims

ABSTRACT OF THE DISCLOSURE

Wire stripping apparatus comprises a pair of cooperable wire severing blades each of which has a wire clamping member on each side. When blades move relatively towards each other, a wire positioned between the blades is severed and the clamping members cooperate with each other to clamp the cut ends of the wire. Insulation parting blades which are spaced from the severing blades on each side of the severing blades part the insulation of the wire ends. The wires are thereafter pulled away from the plane of the severing blades so that the metallic cores in the severed ends are pulled from the insulation which is held by the clamping members.

BACKGROUND OF THE INVENTION

This applicatoin is a continuation-in-part of application Ser. No. 652,929, filed July 12, 1967 and now abandoned. It has been common practice in the past to strip insulation from the ends of wires by means of devices of the general type shown in U.S. Pat. No. 2,497,112 and in FIGS. 20-25 of U.S. Pat. No. 3,019,679. Wire stripping devices of the general type shown in the above mentioned patents comprise a pair of severing blades which are movable relatively towards each other, to cut a wire positioned therebetween, and two pairs of insulation cutting or parting blades, one pair of insulation cutting blades being disposed on one side of the wire severing blades and the other pair of cutting blades being disposed on the other side of the wire severing blades. Wire is fed from a substantially endless source along a path extending between the wire severing and insulation cutting blades and the blades are moved relatively towards each other to sever the wire in the plane of the wire severing blades, and to cut through the insulation of the wire on each side of this plane without cutting into the metallic core of the wire. Thereafter, the wire disposed downstream, relative to the direction of wire feed, from the wire severing blades is pulled further along the path of wire feed and the upstream wire is retracted by a short distance. The insulation cutting blades remain closed during this interval so that the metallic core of the leading end of the wire extending from the endless source and the trailing end of the lead, that is, the wire extending downstream from the severing blades, are pulled from the severed sections of insulation. Devices of this type are in widespread use and, under many circumstances, are entirely satisfactory.

There are, however, certain types of wire insulation which can not be readily stripped by the devices of the type described above, particularly braided or woven insulations which may be of cotton or synthetic fibers such as polyester fibers. It is difficult to make a clean cut through the insulation of such wires such that the end of the wire is cleanly stripped. If the cutting blades are adjusted so that they move almost against the metallic core of the wire, there is always the danger of cutting one or more strands. Insulations of this type, however, can be readily stripped if the insulation is singed or burned rather than cut as with the prior art devices.

However, it is impractical to singe or burn the insulation in a wire stripping device of the type described above and hold the insulation singeing or burning blades in a closed condition while the ends of the wires are pulled away from the severing blades for the reason that the heated blades tend to melt the insulation as the wires are pulled therefrom, causing at least some of the melted insulation to adhere to the metallic core and thus imparting its conductivity. Furthermore, the heated blades may be deformed by the pull at the wire.

An object of the present invention is to provide an improved wire stripping apparatus. A further object is to provide an apparatus in which the wire insulation is parted by means of a singeing or burning operation. A still further object is to provide an improved apparatus for feeding wire, cutting a lead from the end of the feed wire, and stripping the insulation from the trailing end of the lead and from the leading end of the wire being fed.

Figure 1:
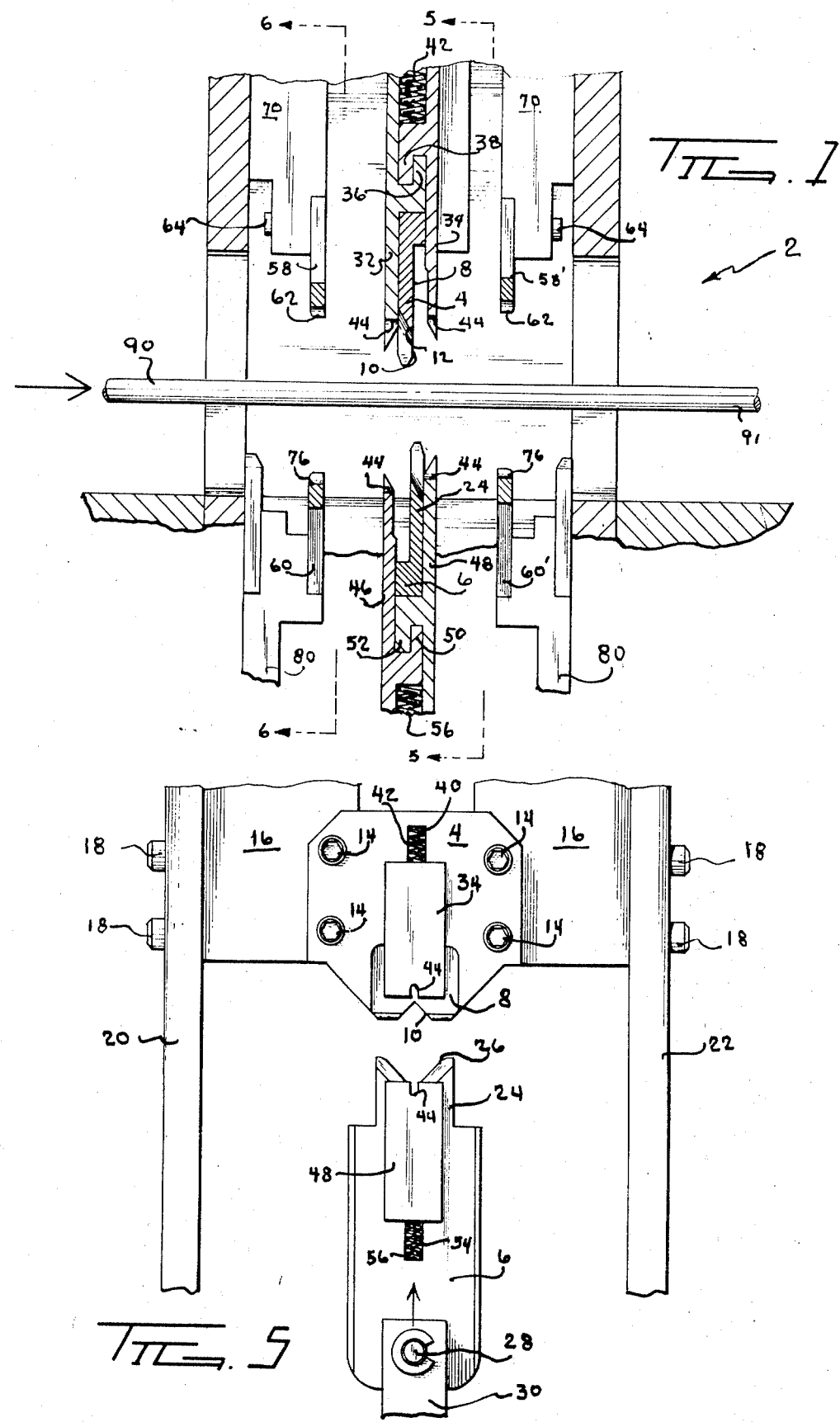
FIG. 1 is a setcional side view showing an insulation stripping apparatus in accordance with a preferred embodiment of the invention with the wire severing and insulation parting blades in their opened condition.

FIGS. 5 and 6 are views taken along the lines 5—5 and 6—6 of FIG. 1;

FIG. 7 is a sectional side view of an alternative embodiment of the invention showing the positions of the parts while the insulation is being parted and immediately before the wire is severed; and FIG. 8 is a fragmentary side view similar to FIG. 7 but showing only the insulation cutting blades, the clamping means, and the upper insulation parting blades, this view showing the positions of the parts after the insulation has been stripped from the wire ends.

The herein disclosed embodiment of the invention comprises a stripping apparatus of the type in which wire 90 is fed, the direction of the arrow in FIG. 1, along a path extending between a pair of wire severing blades which move relatively towards each other to sever a lead 91 from the end of the fed wire. In this description, the term "wire" will be used to identify the conductor 90 which is supplied from an endless source such as a reel and the term "lead" is used to identify the severed length 91 of this conductor which extends downstream (i.e. rightwardly in FIG. 1) from the cutting and stripping apparatus. Immediately prior to severing of the wire, the insulation is parted at a location adjacent to the leading end of the wire and adjacent to the trailing end of the lead. The lead and wire are thereafter moved axially away from the plane of the severing blades to strip insulation from the trailing end of the lead and from the leading end of the wire. The disclosed embodiment of the invention is particularly intended for use in the insulation stripping mechanism of the lead making machine shown in U.S. Pat. No. 3,019,679. Accordingly, only these structural features of the stripping apparatus disclosed in U.S. Pat. No. 3,019,679 which are essential to an understanding of the present invention are shown in detail here, and reference is made to the above-identified patent and particularly of FIGS. 15-25 of U.S. Pat. No. 3,019,679 for further details.

Figure 2:
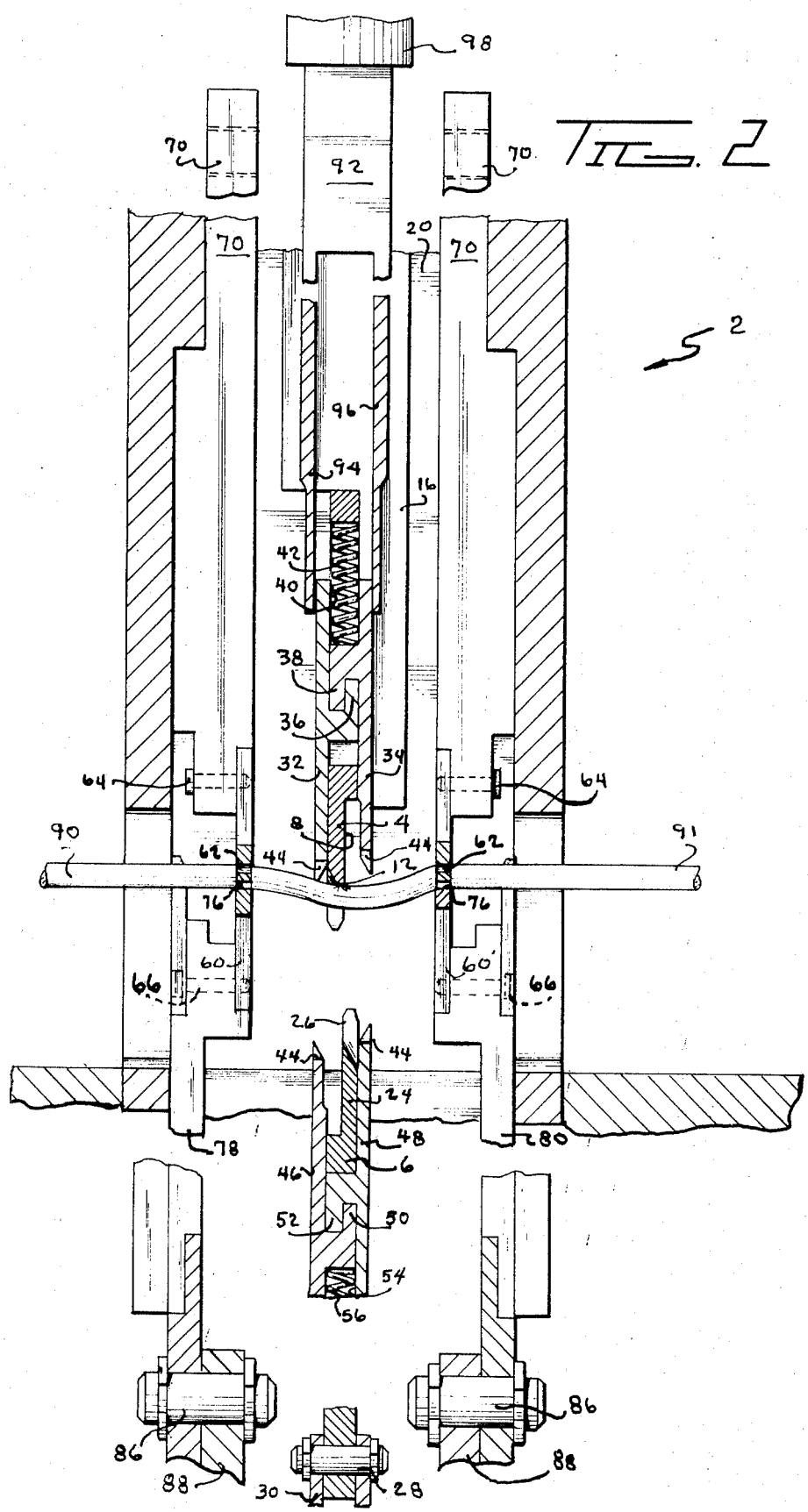
FIG. 2 is a view similar to FIG. 1 but showing the positions of the parts while the insulation is being parted and just before the wire is severed.

Referring to FIGS. 2 and 5, the disclosed stripping apparatus 2 comprises generally an upper wire shearing blade 4 and a lower wire shearing blade 6, the upper blade being fixedly mounted in the stripping mechanism housing and the lower blade being movable relatively towards and away from the upper blade as will be described below. The upper blade 4 has a recess 8 on one side thereof and its lower edge is provided with a V-notch 10 which is bevelled on its lefthand side as viewed in FIG. 2 as shown at 12. The blade 4 is secured by means of suitable fasteners 14 to plate 16 which extend between the housing member walls 20, 22 and which are secured thereto by suitable fasteners 18.

Figure 3:
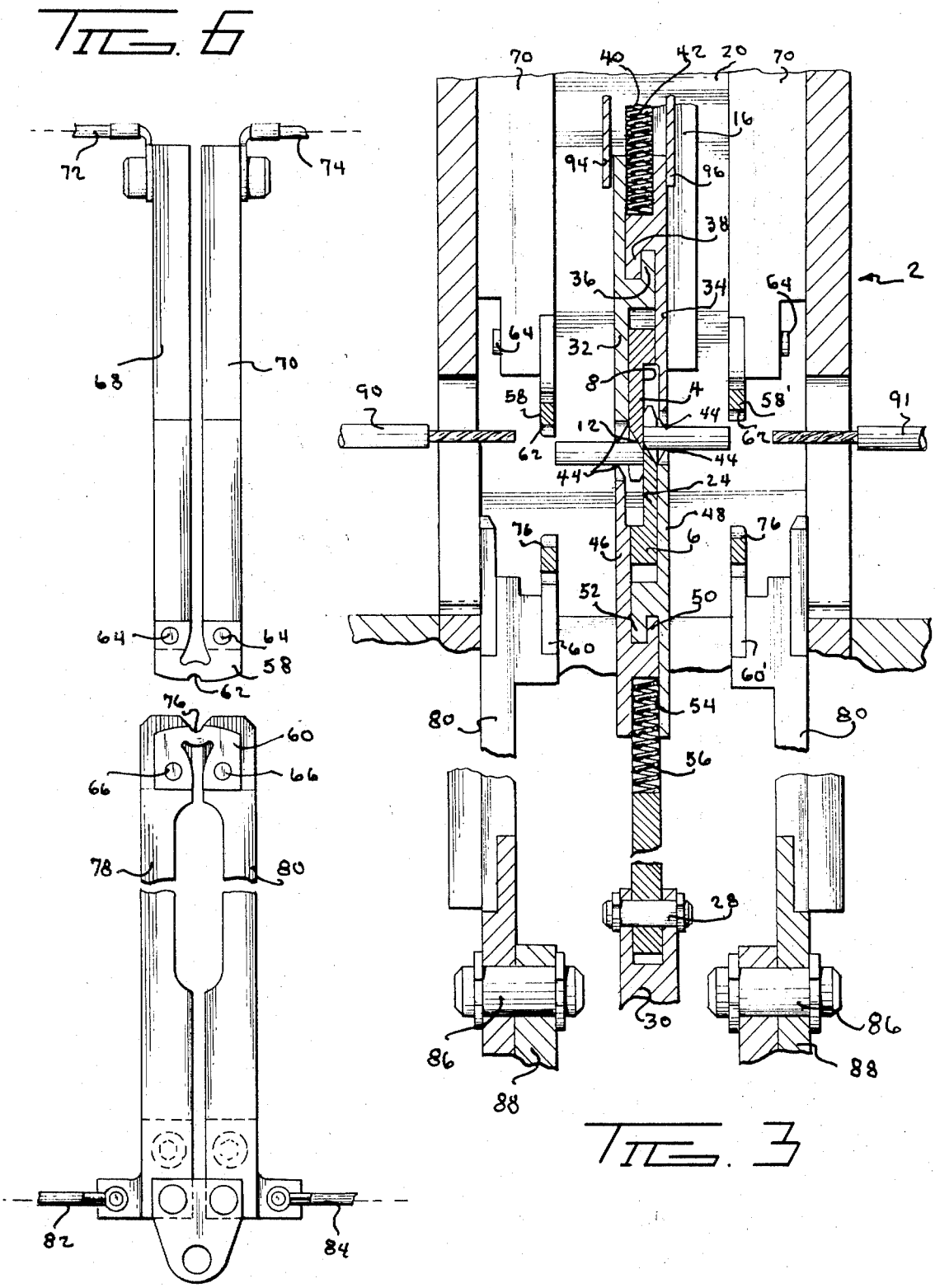
FIG. 3 is a view similar to FIG. 1 but showing the positions of the parts after the wire has been severed and after the insulation has been stripped from the wire ends.
Figure 4:
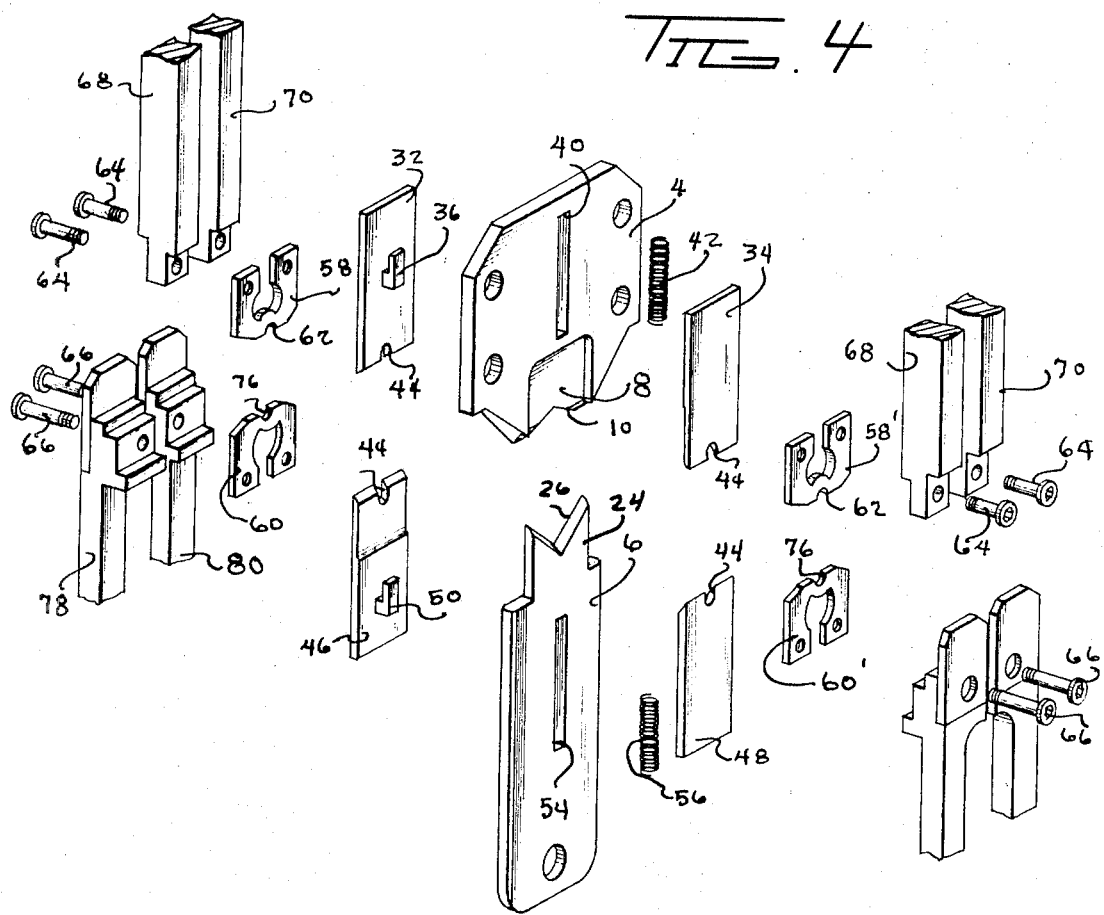
FIG. 4 is a perspective exploded view of the parts of the preferred embodiment.

The lower blade 6 has an extension 24 which conforms to, and which is received in, the recess 8 of the blade 4 during movement of the blade 6 toward the blade 4. The extension 24 is provided with a V-notch 26 on its upper edge which co-operate with the V-notch 10 and which is bevelled on its righthand side as shown in FIG. 1 so that when these blades move relatively towards each other, a wire positioned therebetween will be sheared as illustrated in FIG. 3. The lower blade 6 has a pivotal connection 28 at its lower end to a link 30 which moves relatively upwardly as viewed in FIGS. 1–3 to move the lower blade towards the fixed upper blade. A suitable mechanism for bringing about such motion is shown in the above-identified Pat. 3,019,679. It should be noted that in the embodiment disclosed in that patent, the upper blades are movable and that in the instance disclosure, these blades are fixed.

A pair of wire clamping members or plates 32, 34 are mounted against opposite sides of the fixed blade 4 and have L-shaped arms 36, 38 which are designed to interlock as shown in FIG. 1 and which are received in a slot 40 in the blade 4. A spring 42 is effective between the upper end of this slot and the upper side of the arm 38 thereby to bias both clamping members 32, 34 downwardly as viewed in FIGS. 1–3. The lower edges of these clamping members are provided with notches 44, these notches being in alignment with the root or apex of the V-notch 10 of the blade 4 so that the wire will be surrounded by these notches.

A pair of similar clamping members 46, 48 are mounted against the opposite sides of the lower blade 6 and have interlocking L-shaped arms 50, 52. A spring 56 bears against the lower end of the notch or slot 54 in the blade 6 into which the arms extend and against the underside of the arm 50, thereby to bias these clamping members relatively upwardly as viewed in FIG. 2.

A pair of co-operable burning or singeing blades 58, 60 are provided on the lefthand or upstream side of the severing blades to part the insulation of the wire as will be explained below and similar co-operable singeing or burning blades 58', 60' are provided on the downstream side of the severing blades. Since the manner in which these singeing blades are mounted and energized is substantially the same for the upstream blades and the downstream singeing blades, only the upstream blades will be described in detail. The same reference numerals, differentiated by prime marks, will be used to identify corresponding parts of the upstream and downstream blades which appear on the left and right in FIGS. 1–3.

The upper singeing blade 58 is generally U-shaped and has an arched and notched lower edge as shown at 62, the radius of this notch being such that it approximately conforms to the radius of the metallic core of wire 90 so that the lower side of this blade will move through the insulation and against the metallic core during operation. The arms of the blade 58 are secured by fasteners 64, 66 to a pair of elongated electrically conducting arms 68, 70 which have electrical connections at their upper ends with conductors 72, 74. The arms 68, 70 must be electrically conducting in order to conduct an electrical current to the blade 58 but must be electrically insulated from the housing sidewalls and from any other metallic parts with which they come in contact. It has been found that this insulation can be best achieved by forming these arms of aluminum and providing an insulating anodized coating thereon. The cross-section of the blade 58 and particularly of the portion 62 thereof is relatively small so that it will be heated by the current flowing through the arms to an elevated temperature in order to singe or burn through the insulation of the wire.

The lower singeing blade 60 is similar to the blade 58 and has a notched upper side 76 which is adapted to bear against the wire being stripped. The arms of the blade 60 are secured by fasteners to a pair of elongated arms 78, 80 which again may be anodized aluminum in order that they will be conducting but at the same time insulated from the other metallic parts of the apparatus with which they come in contact. The lower ends of these arms 78, 80 have electrical connections to conductors 82, 84 which conduct power to the arms so that the blade 60 will be heated to a temperature sufficient to singe or burn the insulation. The lower ends of the arms are pivotally connected at 86 to link 88 actuated by suitable cranks (not specifically shown). The movement of these arms towards and away from the wire in timed relation to movement of the shearing blades will be described below.

In use, the wire is fed by any suitable means along a path extending between the open blades (FIG. 1) until the desired length of wire extends rightwardly from the plane of the severing blades 4, 6. The lower singeing blades 60, 60' first move upwardly so that the wire is held between the upper singeing blades and the lower singeing blades, see FIG. 2. The insulation of the wire is circumferentially parted in the planes of both pairs of singeing blades, that is, upstream and downstream from the plane of the cutting blades 4, 6. The lower singeing blades 60, 60' then move downwardly and away from the wire and the lower severing blade moves upwardly towards the upper fixed severing blade. The wire is then cut to form the lead 91 and the co-operable pairs of clamping members 32, 46 and 34, 48 simultaneously move against the wire 90 and lead 91 on each side of the plane of severance. The lower severing blade dwells in its elevated position and the clamping members continue to hold the insulation of the wire and lead while the lead 91 is pulled downstream (rightwardly in FIG. 3) and the wire 90 is pulled leftwardly. This axial movement of the wire and lead has the effect of pulling the wire and lead from the sections of insulation which were previously parted by the burning operation.

The circumferential parting of the insulation on the trailing end of the lead and on the leading end of the wire is accomplished almost instantaneously by melting of the insulation so that the lower singeing blades move upwardly, engage the wire, and then retract. The retractile movement of the lower singeing blades can be accomplished by a suitable cam mechanism of the type disclosed in the above-identified U.S. Pat. No. 3,019,679. The wire and lead can also be pulled axially to accomplish the stripping operations by mechanisms of the type shown in the above-identified U.S. Pat. No. 3,019,679.

In order to provide for positive removal of the short sections of insulation which are clamped between the clamping members as shown in FIG. 3, it is desirable to provide a knock-out device in the form of a rod 92 (FIG. 2) above the shearing blade 4 which has a pair of legs 94, 96. These legs straddle the upper or fixed wire severing blade 4 and the rod 92 is secured to the piston rod on a pneumatic piston cylinder 98 mounted above the apparatus. Air is supplied to the upper end of this cylinder in any suitable manner, for example, by means of a switch actuated valve, at the end of the operating cycle to cause the rod 92 and the legs 94, 96 to move downwardly. Such downward movement of these rods removes the severed sections of insulation if the sections should happen to stick to either of the clamping members. Final removal of the insulation from the vicinity of the severing blades may be accomplished by means of a suitable air blast.

As previously noted, for best results, the singeing blades 58, 60, 58', 60' should be designed such that they will be heated by the power flowing through the arms 68, 70 and 78, 80 to a degree sufficient to melt or singe the insulation on the wire and the lead. To this end, the blades should have a relatively small cross-section so that they will have a relatively high electrical resistance in their singeing areas 62, 76.

A principal advantage of the invention, as compared with prior art stripping devices, is that the insulation parting blades (the singeing blades 58, 60, 58', 60' in the disclosed embodiment) move against the insulation of the wire for only a brief interval and are retracted prior to stripping. The end sections of insulation on the wire and lead are held by the clamping members 32, 46, 34, 48 during the actual stripping operation. This arrangement and sequence of operations is particularly advantageous in stripping devices in which the insulation is singed or burned for the reason that if the insulation parting blades, rather than clamping members as in the present invention, are employed to retain the cut sections of insulation against movement when the wire and lead are moved axially away from a plane of severance, a mass or glob of fused viscous insulating material is formed and adheres to the wire which will preclude the possibility of obtaining a clean stripping action. A further advantage of the invention is that by virtue of the arrangement of the clamping members with respect to the severing blade, virtually no space is required between the clamping members and the severing blades, and the singeing blades can, if desired, be moved extremely close to the severing blades. It is thus possible to strip only a very short length of insulation from the end of the wire and from the trailing end of the lead.

FIGS. 7 and 8 show an alternative embodiment of the invention which is substantially similar to the previously described embodiment except that this alternative embodiment does not have the separate upper clamping plates 32, 34 of the previously described embodiment. In the embodiment of FIG. 7, the legs 94a, 96a of the knockout rod 92a are positioned against the faces of the upper severing blade 4 and function as upper clamping plates. As shown in FIGS. 7 and 8, these legs 94a, 96a are coplanar with the lower clamping plates 46, 48 so that upon upward movement of these clamping plates, the insulation of the wire and lead will be clamped between the lower clamping plates and the lower ends of the legs as shown in FIG. 8. Since the rod 92a and the legs 94a, 96a are moved downwardly from the position of FIG. 7 to the position of FIG. 8 by the compressed air in the previously described cylinder 98, the legs 94a, 96a behave as though they were resiliently biased downwardly when they clamp the wire insulation in co-operation with the lower clamping plates 46, 48 as shown in FIG. 8. At the end of the operating cycle, and after the lower severing blade has been moved downwardly from the position of FIG. 8, the legs 94a, 96a are moved downwardly from the position of FIG. 8 as previously described, to eject the short sections of scrap insulation.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. In a wire stripping apparatus of the type comprising means for intermittently feeding insulated wire along a predetermined path and a pair of wire severing blades, said blades being disposed on opposite sides of said path and being movable towards each other to sever a lead from the end of a fed length of said wire, the improvement comprising:

a pair of insulating singeing blades disposed upstream, relative to the direction of wire feed, from said wire severing blades,
means for moving said singeing blades relatively towards each other, while said wire is stationary, to circumferentially part the insulation of said wire,
means for clamping said wire at a location between said singeing blades and said wire severing blades, and means for pulling said wire from the cutting and stripping zone, whereby, the portion of insulation between said singeing blades and said severing blades is stripped from the leading end of said wire.

2. In a wire stripping apparatus of the type comprising means for intermittently feeding insulated wire along a predetermined path and a pair of wire severing blades, said blades being disposed on opposite sides of said path and being movable towards each other to sever a lead from a fed length of said wire, the improvement comprising:

first and second insulation singeing means, said first singeing means being disposed upstream, relative to the direction of wire feed, from said severing blades and said second singeing means being disposed downstream from said severing blades,
first and second clamping means for clamping the leading end of said wire and for clamping the trailing end of said lead, said first clamping means being located between said severing blades and said first singeing means and said second clamping means being located between said severing blades and said second singeing means, and
means for moving said lead axially for a short distance in the direction of wire feed and means for retracting said wire a short distance whereby, after singeing of the insulation of said wire and lead and clamping of said wire and lead, the end sections of insulation are stripped from the trailing end of said lead and from the leading end of said wire.

3. Apparatus as set forth in claim 2 wherein said first and second singeing means each comprise a pair of heated singeing blades.

4. Apparatus as set forth in claim 2 wherein said first and second clamping means each comprise a pair of clamping plates, each plate being disposed against one of said severing blades, said plates being movable relatively towards each other and into clamping engagement with said wire and lead.

5. Apparatus as set forth in claim 4 wherein said plates are mounted on said severing blades, and including resilient means effective between each of said severing blades and said clamping plates, said resilient means urging said plates relatively towards said path.

6. Apparatus as set forth in claim 2 wherein said first and second clamping means comprises opposed plates on opposite sides of said severing blades, the said plates on one of said severing blades comprising legs extending from a rod and in straddling relationship to said one severing blade, said rod being movable towards said path whereby said legs are moved against the plates on the other severing blade.

References Cited

UNITED STATES PATENTS

| 2,497,112 | 2/1950 | Andren | 81—9.51 |
| 3,019,679 | 2/1962 | Schwalm et al. | 81—9.51 |
| 3,139,777 | 7/1964 | Gindoff | 81—9.5 |
| 3,199,383 | 8/1965 | Gudmestad | 81—9.51 |

LESTER M. SWINGLE, Primary Examiner

R. V. PARKER, Jr., Assistant Examiner